United States Patent [19]
Takemori et al.

[11] Patent Number: 5,820,795
[45] Date of Patent: Oct. 13, 1998

[54] MANUFACTURING METHOD OF MAGNETO-OPTICAL MASTER DISK

[75] Inventors: Hirotoshi Takemori; Tetsuya Inui; Toshikazu Nagaura, all of Nara; Kenji Ohta, Kitakatsuragi-gun, all of Japan

[73] Assignee: Sharp Kabushiki Kaisha, Osaka, Japan

[21] Appl. No.: 498,378

[22] Filed: Jul. 5, 1995

[30] Foreign Application Priority Data

Jul. 8, 1994 [JP] Japan .................................. 6-157659

[51] Int. Cl.⁶ .............................. B29D 11/00; G11B 7/24
[52] U.S. Cl. ..................... 264/1.36; 264/1.33; 264/2.5; 264/1.37; 425/174.4
[58] Field of Search ................................ 264/1.33, 1.36, 264/106, 107, 1.37, 2.5; 369/44.13; 425/174.4

[56] References Cited

U.S. PATENT DOCUMENTS

| | | |
|---|---|---|
| 4,893,298 | 1/1990 | Pasman et al. . |
| 4,942,565 | 7/1990 | Lagadec . |
| 5,177,727 | 1/1993 | Mashimo . |
| 5,266,136 | 11/1993 | Kanome et al. ...................... 264/1.33 |
| 5,279,775 | 1/1994 | Thomas et al. ........................ 264/1.33 |
| 5,539,724 | 7/1996 | Ohtomo ............................... 369/44.13 |

FOREIGN PATENT DOCUMENTS 5-314538  11/1993  Japan .

OTHER PUBLICATIONS

Dr. G. Otte, et al, "Langspiel–Bildplatte mit optischer Abtastung", Funk–Technik, 1972 No. 19, vol. 2, pp. 692–694.

Primary Examiner—Mathieu D. Vargot
Attorney, Agent, or Firm—Nixon & Vanderhye

[57] ABSTRACT

It can be selected whether to form a both-side wobble groove whose both side walls wobble by irradiating two light beams while oscillating the same along the radius of a magneto-optical master disk, or to form a one-side wobble groove one of whose side walls alone wobbles by irradiating two light beams while fixing one of the same and oscillating the other along the radius of the magneto-optical master disk. Then, either a single one-side or both-side groove for tracking-use is formed by irradiating both the two light beams on a photo-resist applied on a glass substrate in accordance with address data. As a result, grooves of different types, both-side and one-side grooves, can be formed continuously in the exposing process.

18 Claims, 10 Drawing Sheets

MANUFACTURING METHOD OF MAGNETO-OPTICAL MASTER DISK

FIELD OF THE INVENTION

The present invention relates to a manufacturing method of a magneto-optical master disk, wherein a single tracking-use guiding groove is formed by irradiating at least two beams of laser light on a photo-resist applied on a glass substrate in accordance with address data.

BACKGROUND OF THE INVENTION

Of all the optical memories which record or reproduce data using light, a magneto-optical disk has been already put into practical use. The magneto-optical disk uses a recording film made of a perpendicular magnetization film as a recording medium, and it records the data when irradiated by laser light while the magnetic filed is being applied to give a certain magnetization direction within a light spot. To mass-produce magneto-optical disks, a master disk thereof is manufactured first in the identical shape.

Figures 2A, 2B:
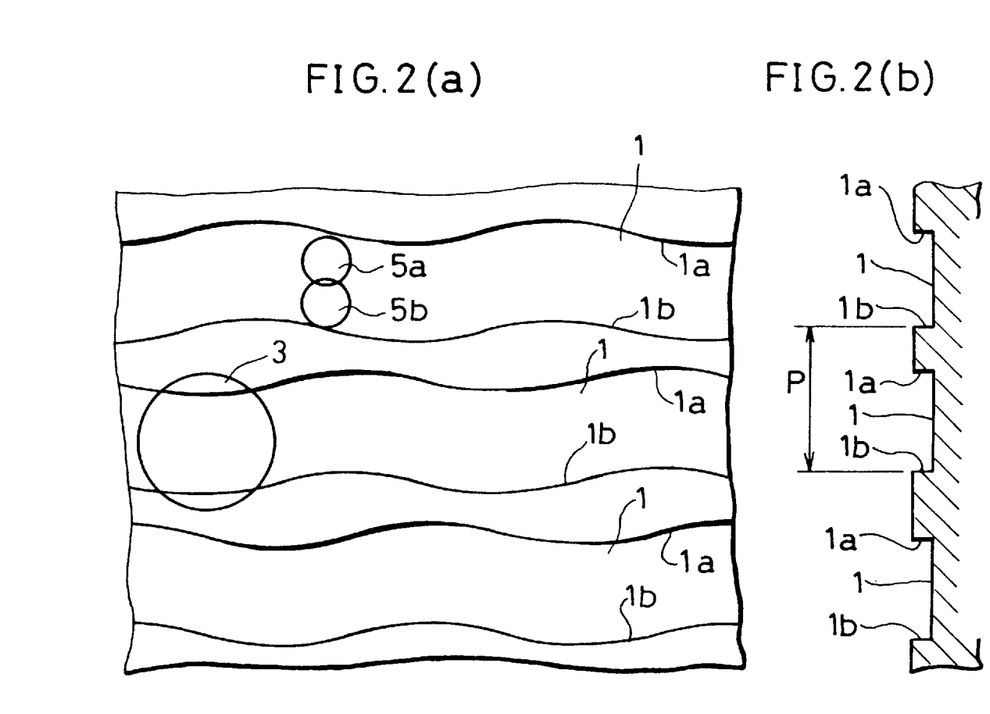
FIG. 2(a) is a plane view showing the structure of a magneto-optical master disk having both-side wobble grooves.
FIG. 2(b) is a cross sectional view showing the structure of the magneto-optical master disk shown in FIG. 2(a).

As shown in FIGS. 2(a) and 2(b) explaining the present invention, each of the above magneto-optical disks has both-side wobble grooves 1 which serve as tracking-use guiding grooves, thereby ensuring that a light spot 3 follows the both-side wobble grooves 1, or namely, the tracks. The width of each both-side wobble groove 1 is determined depending on a track pitch P. For example, let the track pitch P be 1.6 $\mu$m, then the width of the groove 1 is limited to 1.0–1.2 $\mu$m. Each both-side wobble groove 1 is formed in such a manner that it wobbles along a radius of the magneto-optical disk, and the address data of the light spot 3 can be calculated by taking out wobbling frequency components of a tracking signal.

The data are recorded into or reproduced from a track that coincides with the both-side wobble groove 1. The track pitch P is approximately the same as the diameter of the light spot 3, and the diameter of the light spot 3 is determined by the wavelength of the laser light and the numerical aperture of an objective lens that focuses the laser light to the light spot 3. The typical wavelength of the laser light and numerical aperture of the objective lens are 780 nm–830 nm and 0.45–0.6, respectively. Thus, the diameter of the light spot 3 is 1.2–1.4 $\mu$m and accordingly the track pitch P is limited to 1.4–1.6 $\mu$m, thereby making the minimum magneto-recording domain of approximately 0.8 $\mu$m.

A method to enhance the recording density using an MSR (Magnetic Super Resolution) effect has been used in recent years, in which a recording film of multi-layer structure is used to form a recording domain far smaller than the size of the light spot 3. To be more precise, the MSR enables the recording domain of 0.4 $\mu$m, which is about half the above recording domain. For further information of the MSR, please refer to Journal of the Japan Applied Magnetic Society, pp838–845, Vol. 15, No. 5, 1991.

Using the MSR effect, however, weakens the tracking signal when the track pitch P is about 0.8 $\mu$m, thereby making precise tracking impossible. Moreover, since using the MSR effect also makes it difficult to take out the wobbling frequency components of the tracking signal, the address data can not be calculated correctly.

To eliminate this problem, the applicant of the present invention discloses a method in Japanese Laid-Open Patent Application No. 5-314538/1993, in which only one of the side walls of the tracking groove wobbles in accordance with the address data and the mean value of widths across each groove and that of the widths across the land between the grooves are made equal.

Figure 3A:
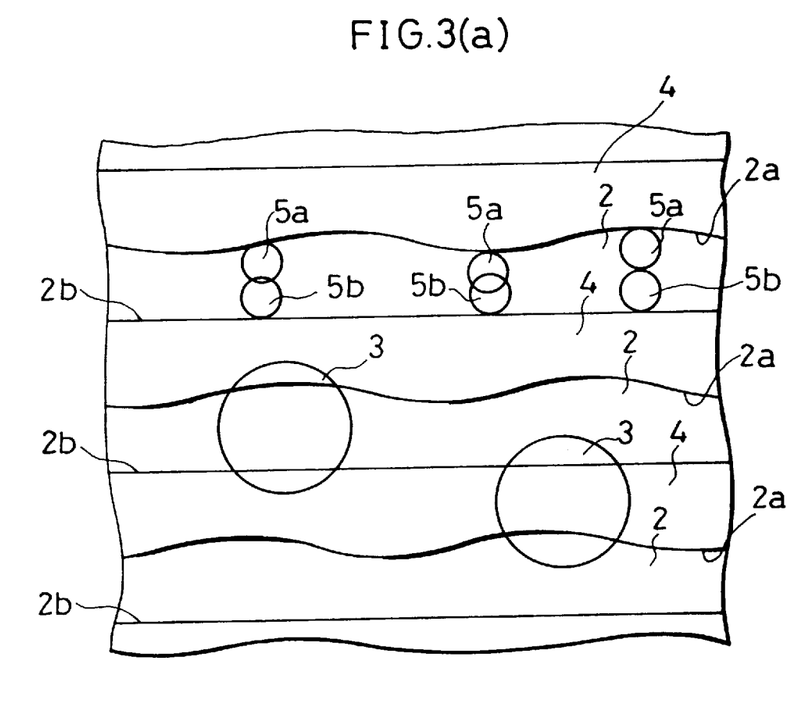
FIG. 3(a) is a plane view showing the structure of a magneto-optical master disk having one-side wobble grooves.
Figure 3B:
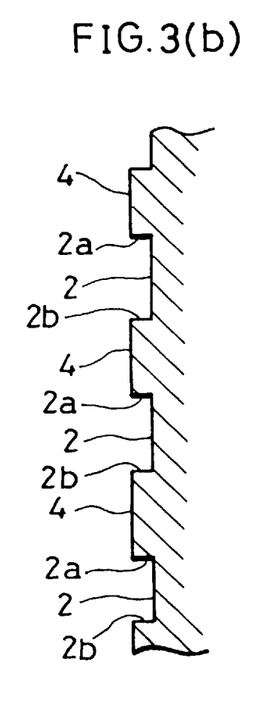
FIG. 3(b) is a cross sectional view showing the structure of the magneto-optical master disk shown in FIG. 3(a).
Figure 10:
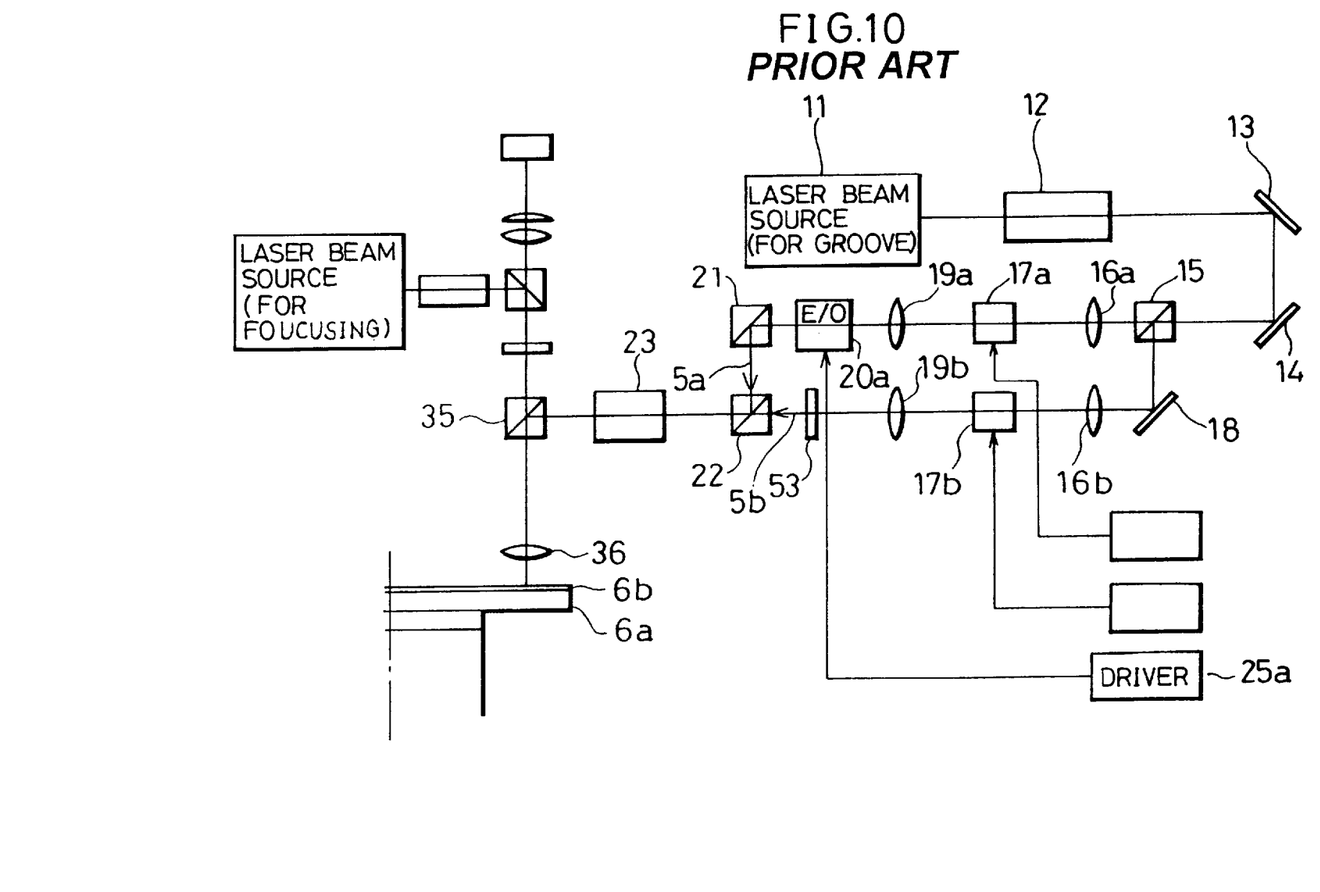
FIG. 10 is a view depicting the structure of a conventional magneto-optical master disk manufacturing apparatus.

A magneto-optic master disk having such one-side wobble grooves 2 that wobble along one side is manufactured by a method shown in FIGS. 3(a) and 3(b) explaining the present invention. That is to say, two light beams 5a.5b, which are spaced apart not in the direction in which the one-side wobble groove 2 extends, are irradiated while only the light beam 5a is oscillated along the radius of the magneto-optical master disk in accordance with the address data. To be more precise, as shown in FIG. 10, the laser light emanated from a laser light source 11 passes through a noise curbing device 12 to reduce the noise first, and thence goes into a beam splitter 15 after it is reflected sequentially by mirrors 13.14. The laser light is split in two by the beam splitter 15: one goes into an optical modulator 17a as the light beam 5a through a focusing-use convex lens 16a, while the other goes into an optical modulator 17b as the light beam 5b through a mirror 18 and a convex lens 16b.

The light beam 5a, after it has passed through the optical modulator 17a, goes into a polarizing prism 22 through a convex lens 19a, a deflector 20a, and a prism mirror 21. The light beam 5b, after it has passed through the optical modulator 17b, also goes into the polarizing prism 22 through a convex lens 19b and a wavelength plate 53. Then, the light beams 5a.5b are synthesized by the polarizing prism 22 and focused onto a photo-resist 6b placed on a glass substrate 6a, which is the base of the magneto-optical master disk, through a beam expander 23, a 2-color mirror 35, and an objective lens 36.

The deflector 20a provided for the light beam 5a is driven by a driver 25a under these conditions, then the light beam 5a alone oscillates along the radius in accordance with the address data as shown in FIGS. 3(a) and 3(b), thereby forming the one-side wobble grooves 2 that wobble along side walls 2a alone.

Note that when the track pitch P is 1.6 $\mu$m, the wobbling amplitude to wobble the entire groove is ±30 nm, whereas it is ±35–50 nm to wobble the groove along one side wall alone.

With the above method by which only one of the side walls of the groove wobbles in accordance with the address data using the MSR effect and the mean value of the widths across each groove and that of the widths across the land between the grooves are made equal, the data can be stored both in the lands and grooves while using the conventional track pitch P of 1.6 $\mu$m. In this case, both the land and groove can be tracked easily by changing the polarity of the tracking signal.

As has been explained, to wobble only one side wall 2a of each one-side wobble groove 2, the two light beams 5a.5b are irradiated and only one of them, the light beam 5a herein, is oscillated along the radius in accordance with the address data. A deflector using the electro-optics effect or acoustic-optics effect is employed herein to irradiate the light beam while oscillating the same along the radius in accordance with the address data.

It is true that the above magneto-optical master disk manufacturing method makes it possible to manufacture the one-side wobble groove 2 which wobbles along the one side wall alone; however, the same in turn makes it impossible to wobble the entire groove when the track pitch P is normal, for example, 1.6 $\mu$m.

SUMMARY OF THE INVENTION

It is therefore the object of the present invention to provide a manufacturing method of a magneto-optical master disk which can make either the both side walls or one side wall of the groove wobble in an exposing process where the groove is wobbled in accordance with the address data.

To fulfill the above object, the method of manufacturing a magneto-optical master disk of the present invention is characterized by comprising the steps of:

selecting whether to form a guiding groove whose both side walls wobble by irradiating two light beams while oscillating the same along the radius of a magneto-optical master disk, or to form a guiding groove one of whose side walls alone wobbles by irradiating two light beams while fixing one of the same and oscillating the other along the radius of the magneto-optical master disk; and forming a single tracking-use guiding groove by irradiating the two light beams in accordance with address data on a photo-resist applied on a glass substrate.

According to the above structure, whether to form a guiding groove whose both side walls wobble or to form a guiding groove one of whose side walls alone wobbles can be selected when forming a single tracking-use guiding groove. When the former is selected, both the two light beams are irradiated while being oscillated along the radius of the magneto-optical master disk, and when the latter is selected, the two light beams are irradiated while one of them being fixed and the other oscillated along the radius of the magneto-optical master disk.

Thus, grooves of different types, both-side and one-side wobble grooves, can be formed continuously in the exposing process where the grooves are wobbled in accordance with the address data when manufacturing the magneto-optical master disk.

For a fuller understanding of the nature and advantages of the invention, reference should be made to the ensuing detailed description taken in conjunction with the accompanying drawings.

DESCRIPTION OF THE EMBODIMENTS

(FIRST EMBODIMENT)

An embodiment of the present invention will be explained in the following while referring to FIGS. 1 through 5(f). Hereinafter, like components are labeled with like numerals with respect to the prior art and the explanation thereof is omitted for the explanations' convenience.

In the magneto-optical master disk manufacturing method of the first embodiment, either the both-side wobble groove 1 whose both side walls 1a.1b wobble as shown in FIGS. 2(a) and 2(b) or the one-side wobble groove 2 whose side wall 2a alone wobbles as shown in FIGS. 3(a) and 3(b) can be selected when forming a tracking-use guiding groove on a magneto-optical master disk.

As shown in FIGS. 2(a) and 2(b), the width of each both-side wobble groove 1 is determined depending on the track pitch P. For example, let the track pitch P be 1.6 $\mu$m, then the width of the both-side wobble groove 1 is limited to 1.0–1.2 $\mu$m. The both-side wobble groove 1 is formed in such a manner that it wobbles along the radius of the magneto-optical master disk, and the address data of the light spot 3 can be calculated by taking out the wobbling frequency components of the tracking signal.

The data are recorded into or reproduced from a track that coincides with the both-side wobble groove 1. The track pitch P is approximately the same as the diameter of the light spot 3, and the diameter of the light spot 3 is determined by the wavelength of the laser light and the numerical aperture of an objective lens that focuses the laser light to the light spot 3. The typical wavelength of the laser light and numerical aperture of the objective lens are 780 nm–830 nm and 0.45–0.6, respectively. Thus, the diameter of the light spot 3 is 1.2–1.4 $\mu$m and the track pitch P is limited to 1.4–1.6 $\mu$m, thereby making the minimum magneto-recording domain of 0.8 $\mu$m.

Whereas as shown in FIGS. 3(a) and 3(b), in case of the magneto-optical master disk having the one-side wobble grooves 2, the mean value of the widths across each one-side wobble groove 2 and that of the widths across a land 4 between the one-side wobble grooves 2 are made equal.

To form the one-side wobble groove 2, two light beams 5a.5b, which are spaced apart not in the direction in which the one-side wobble groove 2 extends, are irradiated while only the light beam 5a is oscillated along the radius of the magneto-optical master disk in accordance with the address data by driving the deflector 20a using the driver 25a, which will be explained below. The both-side wobble groove 1 is formed by oscillating both the light beams 5a.5b along the radius of the magneto-optical master disk.

Note that when the track pitch P is 1.6 μm, the wobbling amplitude is ±35–50 nm in case of the one-side wobble groove 2 whereas it is +30 in case of the two-sided wobble groove 1. Also, note that the data can be stored both in the one-side wobble groove 2 and land 4. In this case, both the one-side wobble groove 2 and land 4 can be tracked easily by changing the polarity of the tracking signal.

Following is an explanation of a manufacturing apparatus of a magneto-optical master disk having the both-side wobble groove 1 or one-side wobble groove 2, that is to say, a recording.exposing apparatus (which is referred to as a cutting apparatus) 10 for manufacturing the master disk.

Figure 1:
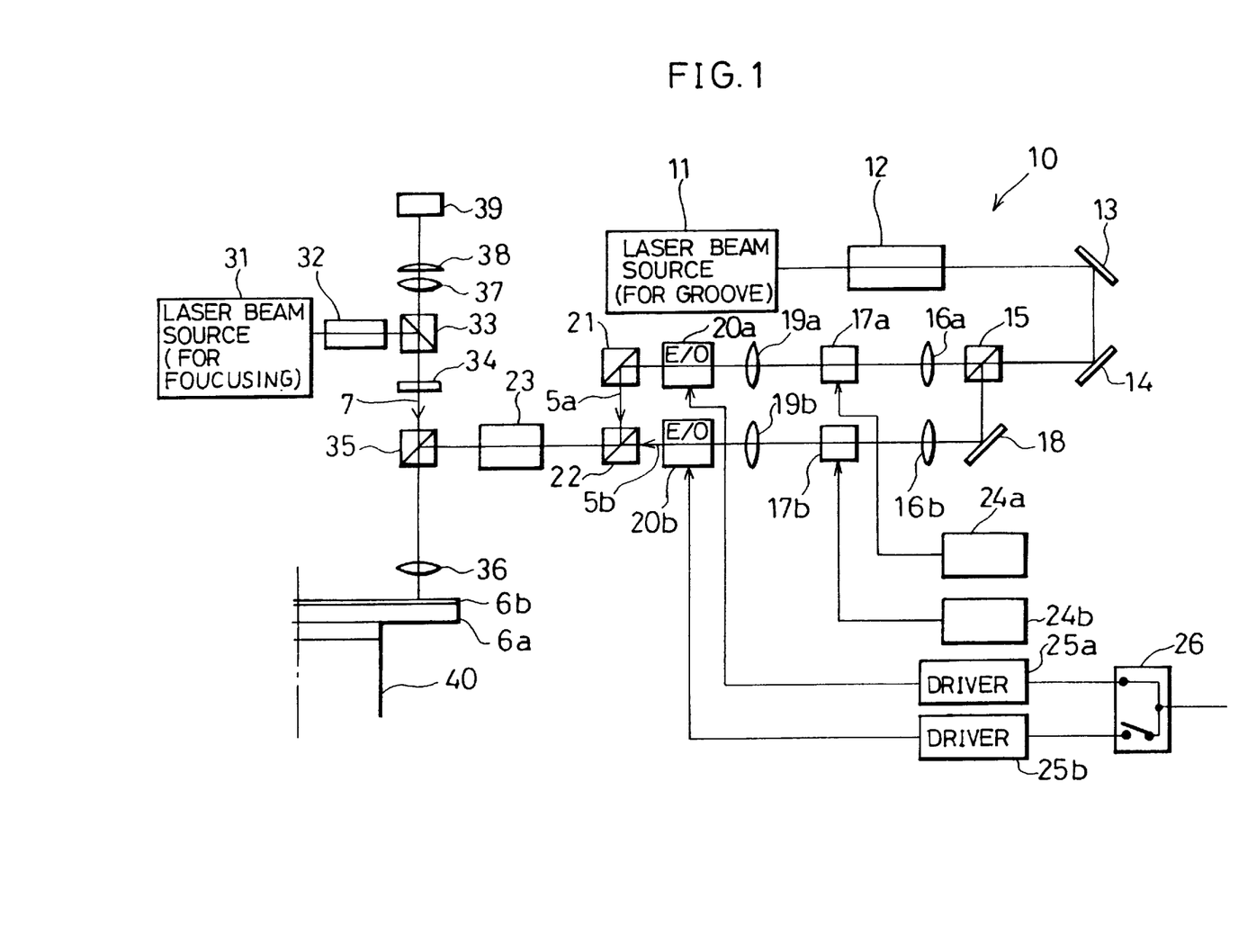
FIG. 1 is a view depicting the structure of a magneto-optical master disk manufacturing apparatus in accordance with an embodiment of the present invention.

As shown in FIG. 1, the cutting apparatus 10 includes two light sources: the laser light source 11 (light source) which emits a light beam onto the photo-resist 6b applied on the glass substrate 6a, which is the base of the magneto-optical master disk, and a laser light source 31 which emits a light beam to adjust the focus. More precisely, the former, such as an argon laser, emits the two light beams 5a.5b to form either the both-side wobble groove 1 or one-side wobble groove 2, while the latter, such as a He—Ne laser, emits a light beam 7 to irradiate the light spot 3.

The laser light emanated from the laser light source 11 passes through the noise curbing device 12 to reduce the noise first, and thence goes into the beam splitter 15 (optical path splitting means) after it is reflected sequentially by mirrors 13.14. The laser light is split in two by the beam splitter 15: one goes into the optical modulator 17a as the light beam 5a through the focusing-use convex lens 16a, while the other goes into the optical modulator 17b as the light beam 5b through the mirror 18 and convex lens 16b. The optical modulators 17a.17b are made of, for example, the acoustic-optics elements.

The reason why the focusing-use convex lenses 16a.19a and 16b.19b are respectively placed in front of and behind the optical modulators 17a.17b is that the optical modulators 17a.17b are made of the acoustic-optics elements in this embodiment. Therefore, the focusing-use convex lenses 16a.19a and 16b.19b may be omitted if another type of optical modulators 17a.17b are used.

The laser light, which has been split in two, passes through the optical modulators 17a.17b and goes into the deflectors 20a.20b (deflecting means) through the convex lenses 19a.19b, respectively. The deflectors 20a.20b can be made of elements that change the direction in which the light is headed using the electro-optics or acoustic-optics effect. In this embodiment, an E/O element (Electro-Optical Deflector) using the electro-optics effect is employed.

The light beam 5a led to the deflector 20a is reflected by the prism mirror 21 in a direction at right angles with respect to the incident angle, and goes into the polarizing prism 22. Also, the light beam 5b is led to the deflector 20b and goes into the polarizing prism 22. Accordingly, the light beams 5a.5b are synthesized by the polarizing prism 22. Then, the synthesized light beam is expanded to an adequate cross section by the beam expander 23, reflected by the 2-color mirror 35, and goes into the objective lens 36. The incident light beam to the objective lens 36 is focused onto the photo-resist 6b on the glass substrate 6a.

The optical modulators 17a.17b and deflectors 20a.20b are under the control of the drivers 24a.24b and 25a.25b (driving means), respectively. Note that since each of the deflectors 20a.20b has different sensitivity characteristics (oscillating characteristics versus applied voltage), the amplitude of the input signal to the drivers 25a.25b, which respectively drive the deflectors 20a.20b, must be adjusted separately in advance. By so doing, the oscillation amount of the two light beams 5a.5b can be controlled more precisely.

The input terminals of the drivers 25a.25b are connected to a changeover switch 26, which switches an input control signal to the driver 25b. To be more specific, in the changeover switch 26, a single signal source corresponding to the address data is connected to the drivers 25a.25b, and a signal is switched between one of the drivers (herein the driver 25b) and the signal source. This makes it easy to turn on or off the driver 25b.

On the other hand, the laser light emanated from the laser light source 31 goes through a noise curbing device 32 to reduce the noise, and is bent by a polarizing beam splitter 33. Subsequently, the laser light from the polarizing beam splitter 33 passes through a ¼-wavelength plate 34, the 2-color mirror 35 to be converged onto the photo-resist 6b by the objective lens 36. The reflected light from the photo-resist 6b goes into the polarizing beam splitter 33 in a manner reversed to the above, that is to say, the reflected light from the photo-resist 6b is focused by the objective lens 36, and passes through the 2-color mirror 35, ¼-wavelength plate 34, and polarizing beam splitter 33. Subsequently, the reflected light is converged into a 4-part split photo-detector 39 through an objective lens 37 and a cylindrical lens 38. Accordingly, a focus servo signal is generated based on a signal from the 4-part split photo-detector 39. By driving the objective lens 36 in the focus direction by a focus servo series, the objective lens 36 can obtain correct focus on the photo-resist 6b on the glass substrate 6a whether a spindle motor 40 rotates or not.

Following is the explanation of the method of manufacturing two kinds of master disks, a magneto-optical master disk having the both-side wobble groove 1, and the one having the one-side wobble groove 2.

To form the both-side wobble groove 1 or one-side wobble groove 2, the input signals to the drivers 25a.25b, which respectively drive the deflectors 20a.20b, are switched by the changeover switch 26.

Figure 4A:
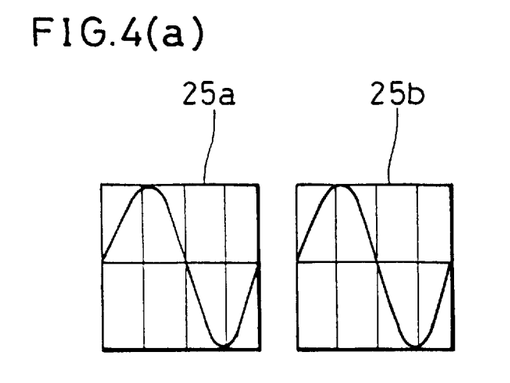
FIGS. 4(a) shows an input signal to two drivers of the magneto-optical master disk manufacturing apparatus of the above embodiment, and more precisely, it shows waveforms when two in-phase signals corresponding to address data are simultaneously inputted into the two drivers, respectively.

To be more specific, in case of forming the both-side wobble groove 1, the changeover switch 26 is switched to input the in-phase signals corresponding to the address data to both the drivers 25a.25b as shown in FIG. 4(a). By so doing, as shown in FIGS. 2(a) and 2(b), both the light beams 5a.5b move along the radius of the magneto-optical master disk and expose the photo-resist 6b, thereby forming the both-side wobble groove 1 corresponding to the address data. That is to say, the oscillation amount of the light beams 5a.5b is controlled depending on the amplitude of the input signals to the drivers 25a.25b using the electro-optics or acoustic-optics effect.

Figure 4B:
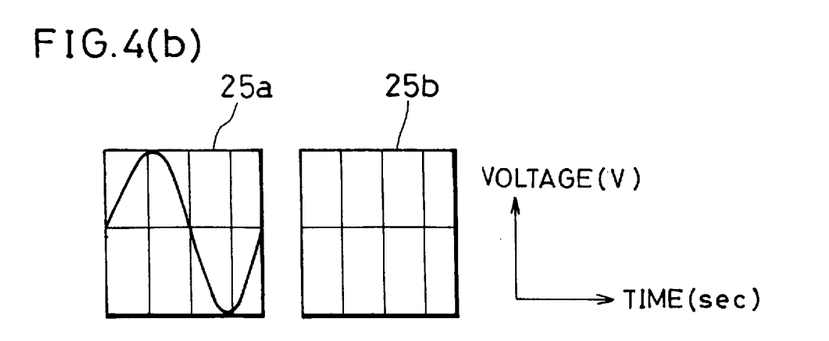
FIG. 4(b) shows waveforms when a signal corresponding to the address data is inputted into one driver only.

In case of forming the one-side wobble groove 2, as shown in FIG. 4(b), the above signal is inputted into the driver 25a alone. By so doing, as shown in FIGS. 3(a) and 3(b), the light beam 5a alone moves along the radius of the magneto-optical master disk and exposes the photo-resist 6b, thereby forming the one-side wobble groove 2 corresponding to the address data.

Next, the process to mass-produce the magneto-optical disks using the master disk thus manufactured, or namely the stamper process, will be explained while referring to FIGS. 5(a) through 5(f). Note that the explanation includes the process to manufacture the master disk.

Figure 5A:
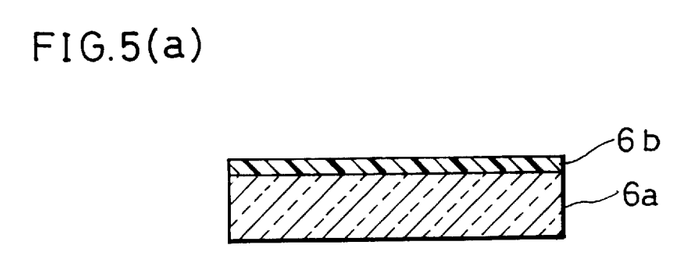
FIG. 5(a) is a view explaining a resist applying process for manufacturing a magneto-optical disk using the magneto-optical master disk.
Figure 5B:
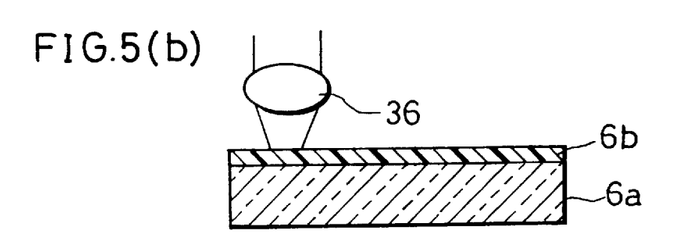
FIG. 5(b) is a view explaining an exposing process.
Figure 5C:
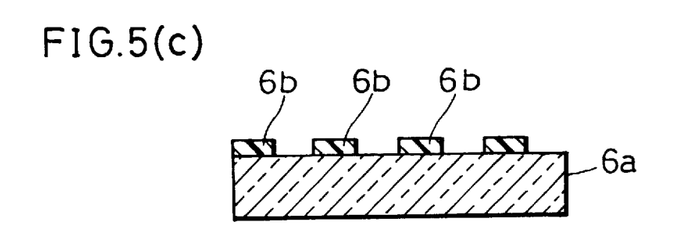
FIG. 5(c) is a view explaining a developing process.
Figure 5D:
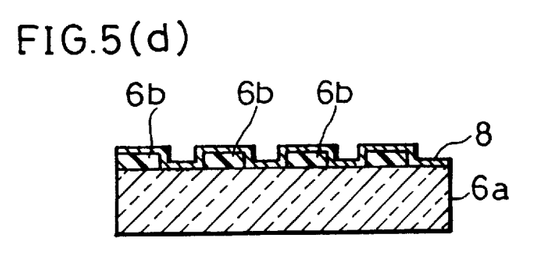
FIG. 5(d) is a view explaining a sputtering process.
Figure 5E:
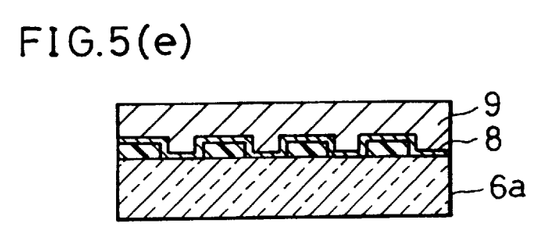
FIG. 5(e) is a view explaining an electrocasting process.
Figure 5F:
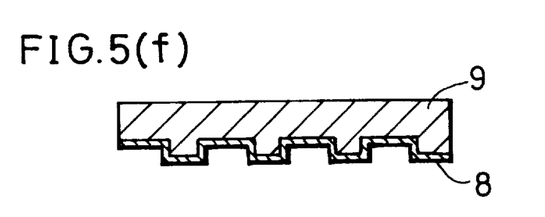
FIG. 5(f) is a view explaining a completed magneto-optical disk made through a series of processes shown in FIGS. 5(a) through 5(e).

To begin with, as shown in FIG. 5(a), the photo-resist 6b, which is a photo-sensitive body, is applied on the washed glass substrate 6a (resist applying process). Next, as shown in FIG. 5(b), the light beams 5a.5b, which are laser light such as ultraviolet rays, are focused on the photo-resist 6b by means of the objective lens 36 to expose the same, thereby recording a fine pattern as a latent image (exposing process). Then, as shown in FIG. 5(c), the fine pattern is developed with a developer, or namely alkaline solution (developing process). Further, as shown in FIG. 5(d), a conductive film 8 made of Ni or the like is formed on the surface having the fine pattern (sputtering process). Subsequently, as shown in FIG. 5(e), Ni-plating is applied on the conductive film 8 to secure a certain thickness 9 thereon (electrocasting process). Consequently, as shown in FIG. 5(f), a toroidal metal disk having the fine pattern called stamper is manufactured after the rear surface thereof is polished and the internal and external diameters are made, and a substrate of a magneto-optical disk having a desirable groove can be made through injection molding using the stamper thus formed.

As has been explained, in the magneto-optical master disk manufacturing method of the first embodiment, it can be selected whether the both-side wobble groove 1 or the one-side wobble groove 2 is made. When forming the both-side wobble groove 1 whose both side walls 1a.1b wobble, both the light beams 5a.5b are irradiated on the magneto-optical master disk while being oscillated along the radius thereof, and when forming the one-side wobble groove 2 one of whose side walls 2a alone wobbles, the light beams 5a.5b are irradiated on the magneto-optical master disk while one of the two light beams (herein the light beam 5b) being fixed and the other (herein the light beam 5b) oscillated along the radius thereof.

As a result, two types of grooves can be formed successively in the exposing process where the groove is wobbled in accordance with the address data in manufacturing the magneto-optical master disk: both the side walls wobble in one type and only one of the side walls wobbles in the other.

In addition, the selection whether to form the both-side wobble groove 1 or one-side wobble groove 2 can be made by providing the deflectors 20a.20b driven respectively by the drivers 25a.25b on the optical paths of the light beams 5a.5b generated by splitting the light emanated from the laser light source 11 in two to switch input signals to the drivers 25a.25b.

Thus, the above-selection can be made by a simple method for inputting the signals corresponding to the address data into the drivers 25a.25b driving the deflectors 20a.20b, respectively. Since the deflectors 20a.20b are placed in parallel with respect to the optical path, this method is effective, in particular, when the space is limited in the direction in which the light beams 5a.5b are headed.

In this embodiment, the two light beams 5a.5b are oscillated separately by inputting the in-phase signals corresponding to the address data respectively into the drivers 25a.25b which drive the deflectors 20a.20b, respectively. Thus, to oscillate the light beam 5a alone, the signal is inputted into one of the two drivers 25a.25b, herein the driver 25a.

As a result, whether to form the both-side wobble groove 1 or one-side wobble groove 2 can be determined by a specific and simple method. Also, since the oscillation of the two light beams is controlled separately, the amount of oscillation for each light beam can be controlled accurately.

(SECOND EMBODIMENT)

Another embodiment of the present invention will be explained in the following while referring to FIGS. 6 and 7. Hereinafter, like components are labelled with like numerals with respect to the first embodiment and the explanation thereof is omitted for the explanation's convenience.

Figure 6:
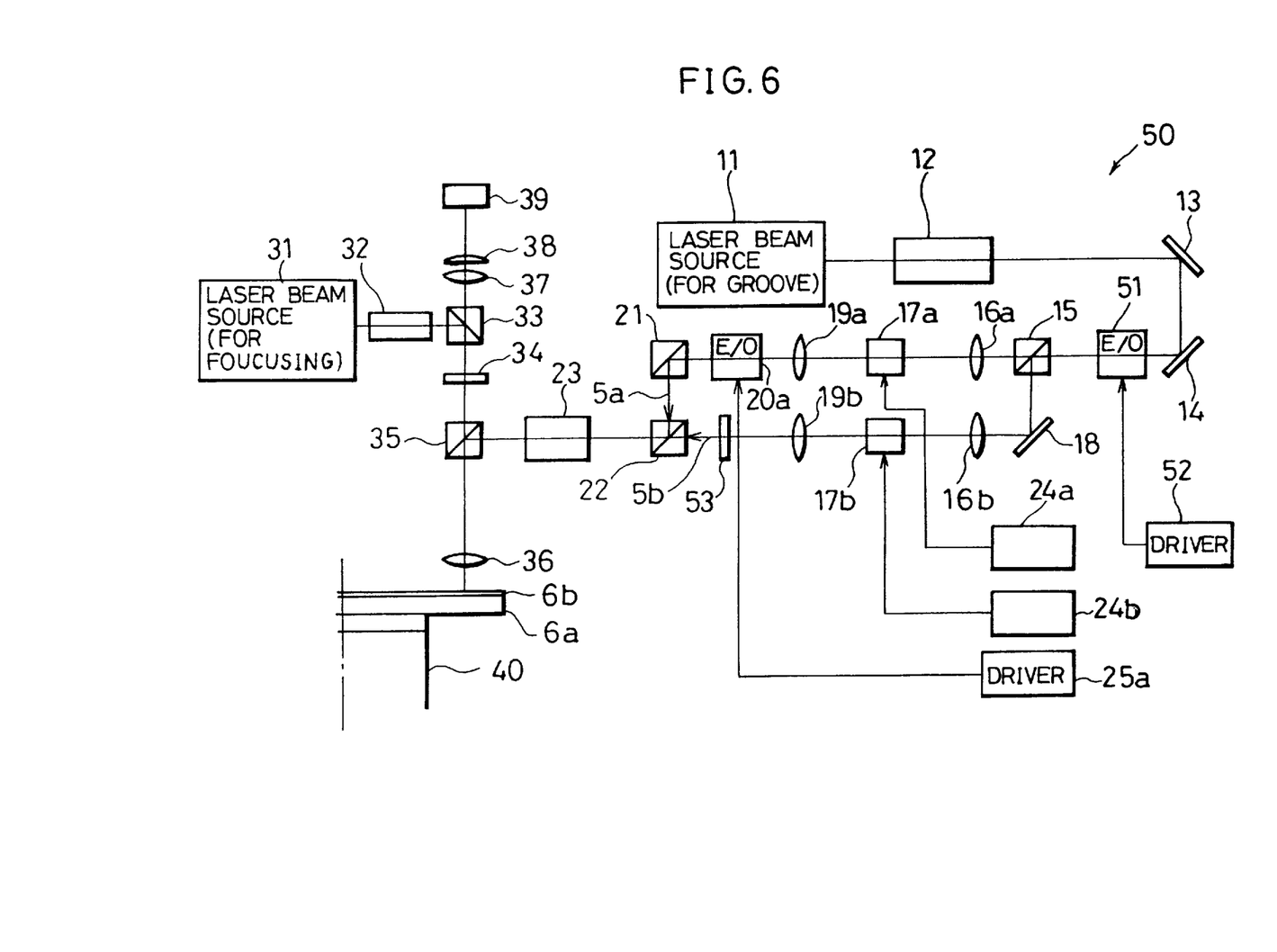
FIG. 6 is a view depicting the structure of a magneto-optical master disk manufacturing apparatus in accordance with another embodiment of the present invention.
Figure 7A:
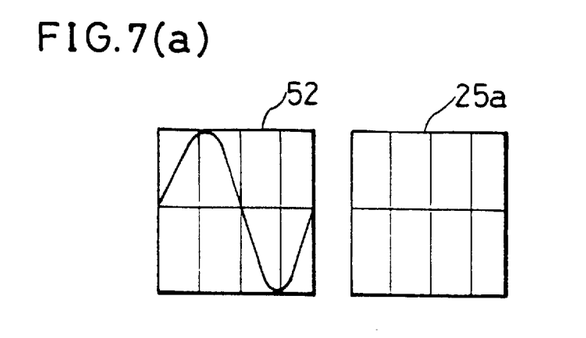
FIG. 7(a) shows an input signal to two drivers of the magneto-optical master disk manufacturing apparatus of the above embodiment, and more precisely, it shows waveforms when a signal corresponding to the address data is inputted into one of the two drivers.
Figure 7B:
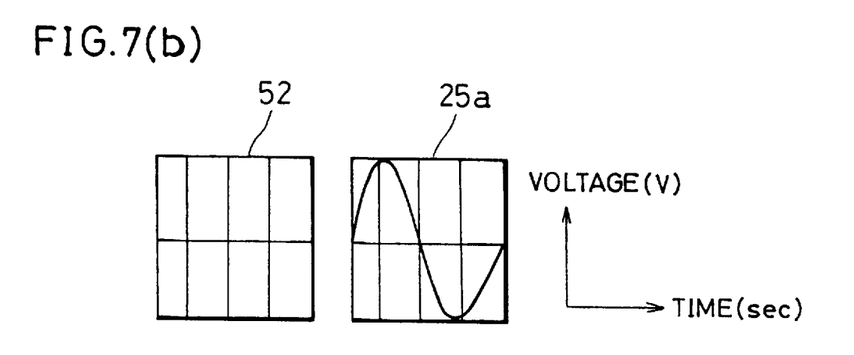
FIG. 7(b) shows waveforms when a signal corresponding to the address data is inputted into the other driver.
Figure 7C:
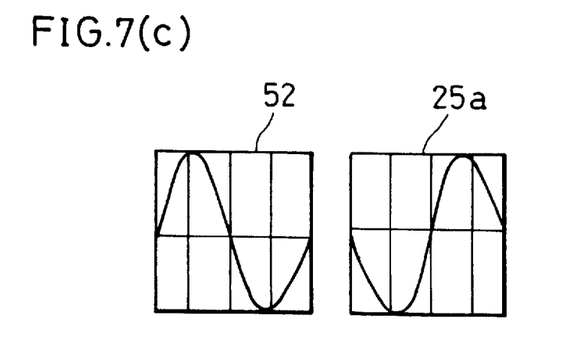
FIG. 7(c) shows waveforms when two anti-phase signals corresponding to the address data are inputted into the two drivers, respectively.

As shown in FIG. 6, a cutting apparatus 50, which is an apparatus for manufacturing the magneto-optical master disk of the second embodiment, includes a deflector 51 and a driver 52. The deflector 51 (first deflecting means) is placed before the reflected light from the mirror 14 is split in two to control the light beams 5a.5b emanated from the laser light source 11 (light source), and the driver 52 (first driving means) is provided to control the deflector 51. Note that the deflector 51 is not necessarily placed before the light emanated from the laser light source 11 is split in two as explained above. For example, the same effect can be obtained when the deflector 51 is placed on the optical path after the laser light is split in two and synthesized again, that is to say, behind the polarizing prism 22 in FIG. 6.

Also, unlike the first embodiment, either the deflector 20a or 20b is provided for one of the light beams 5a or 5b in the second embodiment. To be more specific, the deflector 20a (second deflecting means) is provided for the light beam 5a herein, while the driver 25a (second driving means) is provided to drive the deflector 20a. The deflector 20a is placed in series with respect to the deflector 51. Note that the deflector 20b is omitted herein and the wavelength plate 53 is provided instated.

The operation of the above-structured cutting apparatus 50 will be explained.

To begin with, the laser light emanated from the laser light source 11 goes into the deflector 51 by way of the mirrors 13.14. In case of forming the both-side wobble groove 1, the signal corresponding to the address data is inputted only to the driver 52 as shown in FIG. 7(a), whereas in case of forming the one-side wobble groove 2, the signal corresponding to the address data is inputted only to the driver 25a as shown in FIG. 7(b). Alternately, in case of oscillating the light beam 5a alone, the signal shown in FIG. 7(a) may be inputted to the driver 52 constantly to input the anti-phase signal to the driver 25a as shown in FIG. 7(c).

As has been explained, controlling the input signal to the driver 52 driving the deflector 51 enables not only the simultaneous oscillation of the two light beams 5a.5b but also accurate determination of the oscillation amount. Also, controlling the input signal to the driver 25a driving the deflector 20a makes it possible to control the amount of oscillation of the light beam 5a alone accurately.

Although it is not illustrated, a single signal source corresponding to the address data may be connected to a switch switching the signals to the drivers 52 and 25a from the signal source to facilitate the selection between the both-side groove 1 and one-side groove 2.

Since the deflectors 51.20a are placed in series with respect to the optical path, this structure is effective in terms of space utilization when a physical space is limited in a direction orthogonal to the direction in which the light beams 5a.5b are headed.

As has been explained, in the magneto-optical master disk manufacturing method of the second embodiment, the two light beams 5a.5b are oscillated simultaneously when forming the both-side wobble groove 1 by inputting the signal corresponding to the address data to the driver 52 driving the deflector 51 provided on the optical path before the light emanated from the laser light source 11 is split in two or after the two split light beams are synthesized.

Further, only one of the light beams 5a.5b can be oscillated by inputting the signal to the driver 25a driving the deflector 20a provided on the optical path of either the light beam 5a or 5b (herein the light beam 5a).

As a result, the both-side wobble groove 1 or one-side wobble groove 2 can be selected easily by the switching manipulation of the signal input to the drivers 52.25a.

Also, not only the amount of oscillation of the two light beams 5a.5b is controlled simultaneously, but also that of the light beam 5a alone can be controlled easily.

(THIRD EMBODIMENT)

Another embodiment of the present invention will be explained in the following while referring to FIG. 8. Hereinafter, like components are labelled with like numerals with respect to the first and second embodiments and the explanation thereof is omitted for the explanation's convenience.

Figure 8:
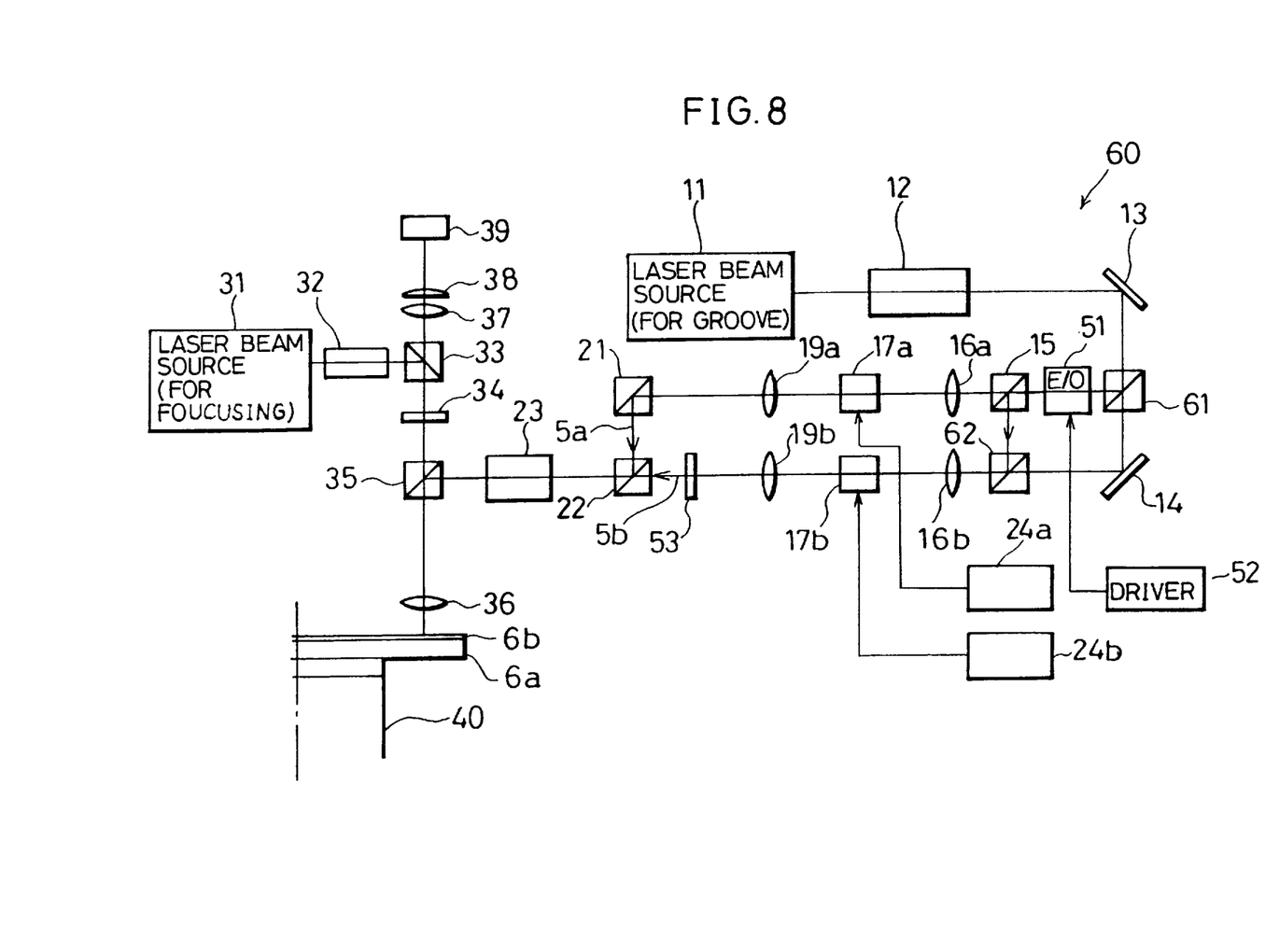
FIG. 8 is a view depicting the structure of a magneto-optical master disk manufacturing apparatus in accordance with another embodiment of the present invention.

As shown in FIG. 8, compared with the counterpart in the second embodiment, a cutting apparatus 60, which is an apparatus for manufacturing the magneto-optical master disk of the third embodiment, additionally includes a beam splitter 61 between the mirrors 13.14 to split the optical path in two: the deflector 51 (deflecting means) is placed on one of the two split optical paths, while the mirror 14 and a polarizing prism 62 are placed on the other. The deflector 51 is driven by the driver 52 (driving means). The light beams 5a .5b emanated from the laser light source 11 are controlled by the above structure.

The light that has passed through the deflector 51 is branched by the beam splitter 15, and the main optical path proceeds as the light beam 5a while the branched optical path goes into the convex lens 16b through the polarizing prism 62. In case that the light that has passed through the deflector 51 goes into the polarizing prism 62, the laser light reflected by the mirror 14 after it has passed through the beam splitter 61 is blocked before it goes into the polarizing prism 62. On the other hand, in case that the light having passed through the deflector 51 is blocked before it goes into the polarizing prism 62, the laser light reflected by the mirror 14 goes into the polarizing prism 62.

Note that the deflectors 20a.20b provided in the first and second embodiments and hence the drivers 25a.25b are omitted herein.

According to the above structure, when both the light beams 5a.5b are oscillated along the radius, the bent light from the beam splitter 61 goes into the convex lens 16a through the deflector 51 and beam splitter 15 to proceed as the light beam 5a, while the bent light from the beam splitter 15 is bent again by the polarizing prism 62 to be led to the convex lens 16b to proceed as the light beam 5b. Note that the laser light reflected by the mirror 14 is blocked before it goes into the polarizing prism 62 in this case.

On the other hand, when only the light beam 5a is oscillated along the radius, the reflected light from the mirror 14 passes through the polarizing prism 62, while the branched optical path from the beam splitter 15 to the polarizing prism 62 is blocked.

As has been explained, in the magneto-optical master disk manufacturing method of the third embodiment:

1) the light emanated from the laser light source 11 is split into two optical paths; and
2) the deflector 51 driven by the driver 52 is provided on one of the split optical paths to generate the light beam 5a, while generating the light beam 5b using either the optical path branched after the light passes through the optical deflector 51 or the other split optical path.

To form the both-side wobble groove 1 that wobbles along the both side walls under these circumstance, both the light beams 5a .5b are oscillated simultaneously by inputting a signal corresponding to the address data to the driver 52 driving the deflector 51, while blocking the other split optical path.

On the other hand, to form the one-side wobble groove 2 which wobbles along the one side wall alone, only the light beam 5b is oscillated by inputting a signal corresponding to the address data to the driver 52 while blocking the branched optical path.

As a result, two types of grooves can be formed successively or selectively: both the side walls wobble in one type and only one of the side walls wobbles in the other.

The fact that only one deflector 51 is used herein makes it possible to assemble the apparatus with fewer components. The damages or deterioration of the sensitivity characteristics of the deflector 51 can be eliminated by simply exchanging the same, and thus making such troubleshooting more easily compared with a case where a number of deflectors 51.20a.20b are used. Also, either the light beam 5a or 5b or both of them can be oscillated along the radius by providing a single deflector 51 and by changing the optical paths. Thus, each component demands the space of substantially the same size as the conventional apparatus.

(FOURTH EMBODIMENT)

Another embodiment of the present invention will be explained in the following while referring to FIG. 9. Hereinafter, like components are labelled with like numerals with respect to the first through third embodiments and the explanation thereof is omitted for the explanations, convenience.

Figure 9:
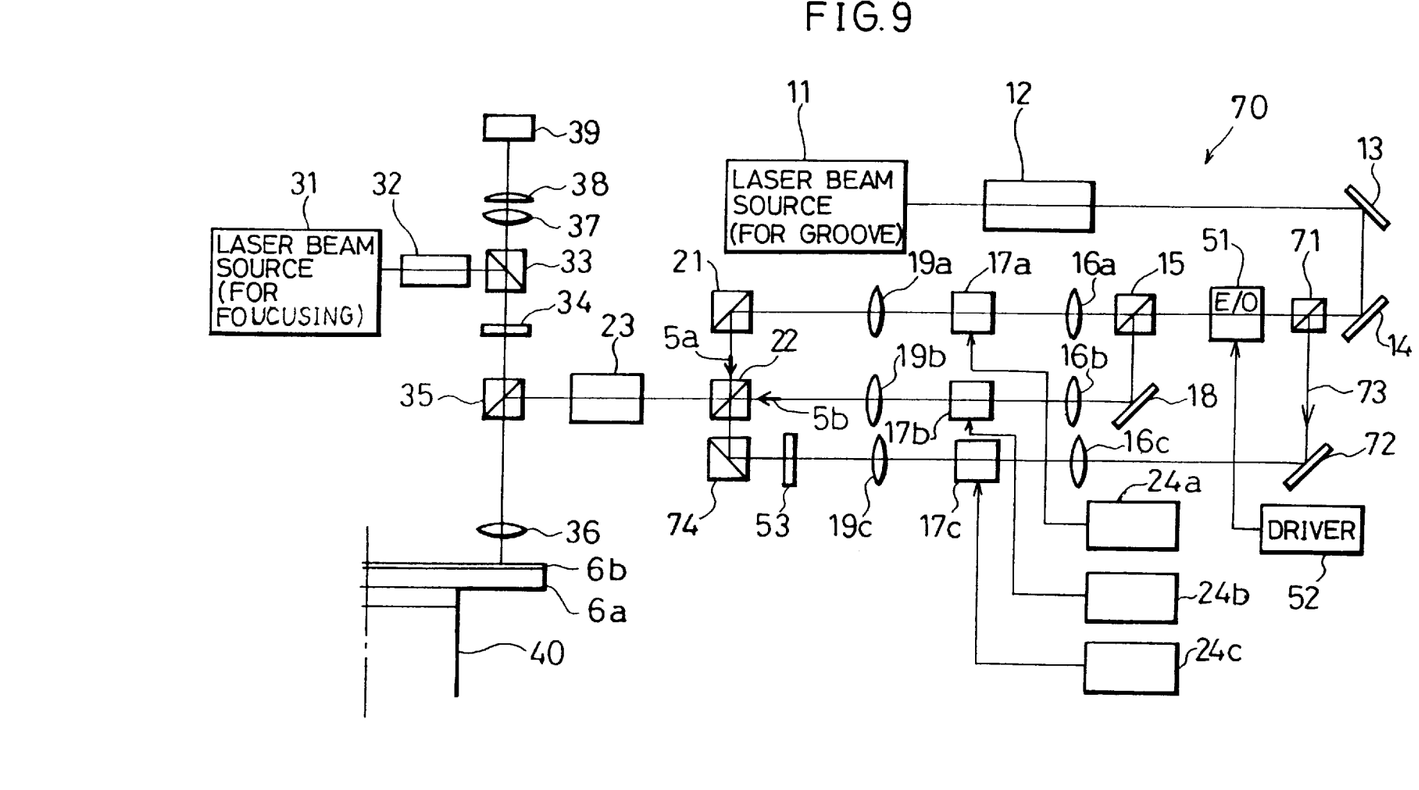
FIG. 9 is a view depicting the structure of a magneto-optical master disk manufacturing apparatus in accordance with another embodiment of the present invention.

As shown in FIG. 9, compared with the counterpart of second embodiment, a cutting apparatus 70, which is an apparatus for manufacturing the magneto-optical master disk of the fourth embodiment, additionally includes a beam splitter 71 between the mirror 14 and the deflector 51 (deflecting means). The beam splitter 71 splits the reflected light from the mirror 14 in two to generate a third light beam. A split light beam 73 generated by the beam splitter 71 goes into the polarizing prism 22 through a mirror 72, a convex lens 16c, an optical modulator 17c, a convex lens 19c, the wavelength plate 53, and a prism mirror 74. The incident light beam 73 is synthesized with the other two light beams 5a .5b by the polarizing prism 22.

The driver 52 (driving means) and a driver 24c are provided to drive the deflector 51 and optical modulator 17c, respectively. Note that the deflectors 20a.20b provided in the first and second embodiments and hence the drivers 25a .25b are omitted herein.

According to the above structure, a signal corresponding to the address data is inputted to the driver 52 driving the deflector 51. Under these conditions, when the light beams 5a.5b are selected from the three light beams 5a.5b.73, both the light beams 5a.5b oscillate along the radius, and when the light beams 5b.73 are selected, only one of the light beams 5b.73 oscillates. The selection between the light beams 5a.5b and 5b.73 can be made by the opening and closing of a shutter or the like.

As has been explained, in the magneto-optical master disk manufacturing method of the fourth embodiment, the deflector 51 driven by the driver 52 is provided on the optical path of the light emanated from the laser light source 11, and the light having passed through the deflector 51 is split into the first and second optical paths, while the branched optical path is generated before the light emanated from the laser light source 11 goes into the deflector 51.

To oscillate both the light beams 5a.5b along the radius of the magneto-optical master disk, a signal corresponding to the address data is inputted to the driver 52 and the light beam 5a and split optical path, or namely the light beam 5b, are selected, while the branched optical path, or namely the light beam 73 is blocked. On the other hand, to oscillate only one light beam along the radius of the magneto-optical master disk, the split optical path, or namely the light beam 5b, and the branched optical path, or namely the light beam 73, are selected while the light beam 5a is blocked.

As a result, two types of grooves can be formed successively with ease: both the side walls wobble in one type and only one of the side walls wobbles in the other.

In addition, the fact that only one deflector 51 is used herein makes it possible to assemble the apparatus with fewer components, and the damages or deterioration of the sensitivity characteristics of the deflector 51 can be eliminated easily. Further, providing three optical paths makes it possible to determine the interval between two light beams in advance.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. In a single machine, a method of manufacturing a magneto-optical master disk comprising the steps of:
   selecting whether to form a guiding groove whose both side walls wobble by irradiating two light beams while oscillating the same along a radius of a magneto-optical master disk, or to form a guiding groove whose one side wall alone wobbles by irradiating two light beams while fixing one of said two light beams and oscillating the other along the radius of the magneto-optical master disk; and
   forming a single tracking-use guiding groove by irradiating said two light beams on a photo-resist applied on a glass substrate in accordance with address data.

2. The manufacturing method of claim 1 further comprising the step of providing two deflecting means driven by their respective driving means on two optical paths of two light beams, respectively, said two light beams being made by splitting light emanated from a light source in two,
   wherein one of said two kinds of guiding grooves is selected by switching an input signal to said two driving means.

3. The manufacturing method of claim 2, wherein said two light beams are oscillated along the radius of said magneto-optical master disk by inputting in-phase signals to each driving means simultaneously, while one of said two light beams alone is oscillated along the radius of said magneto-optical master disk by inputting a signal into one of said two driving means.

4. In a single machine, a method of manufacturing a magneto-optical master disk comprising the steps of:
   providing first deflecting means driven by first driving means on an optical path of light emanated from a light source before said light is split into two light beams, and second deflecting means driven by second driving means on an optical path of one of said two light beams;
   selecting, by switching an input signal to said two driving means, whether to form a guiding groove whose both side walls wobble by irradiating said two light beams while oscillating the same along a radius of a magneto-optical master disk, or to form a guiding groove one of whose side walls wobbles by irradiating said two light beams while fixing one of the same and oscillating the other along the radius of the magneto-optical master disk; and
   forming a single tracking-use guiding groove by irradiating said two light beams on a photo-resist applied on a glass substrate in accordance with address data.

5. In a single machine, a method of manufacturing a magneto-optical master disk comprising the steps of:
   providing first deflecting means driven by first driving means on an optical path of one of two light beams made by splitting light emanated from a light source in two, and second deflecting means driven by second driving means on an optical path made by synthesizing said two light beams,
   selecting, by switching an input signal to said two driving means, whether to form a guiding groove whose both side walls wobble by irradiating both of said two light beams while oscillating the same along a radius of a magneto-optical master disk, or to form a guiding groove one of whose side walls wobbles by irradiating said two light beams while fixing one of the same while oscillating the other along the radius of the magneto-optical master disk; and
   forming a single tracking-use guiding groove by irradiating said two light beams on a photo-resist applied on a glass substrate in accordance with address data.

6. In a single machine, a method of manufacturing a magneto-optical master disk comprising the steps of:
   splitting light emanated from a light source in two to generate two optical paths first and thence providing deflecting means driven by driving means on one of said split optical paths to generate an optical path branched therefrom, a signal corresponding to address data being inputted into said driving means;
   selecting whether to oscillate two light beams through said split optical path and said branched optical path along a radius of a magneto-optical master disk while blocking the other split optical path, or to oscillate one of light beams through said two split optical paths along the radius of said magneto-optical master disk while blocking said branched optical path; and
   forming a single tracking-use guiding groove by irradiating said two light beams on a photo-resist applied on a glass substrate in accordance with address data.

7. In a single machine, a method of manufacturing a magneto-optical master disk comprising the steps of:
   providing deflecting means driven by driving means on an optical path of light emanated from a light source, and splitting said optical path into a first optical path and a second optical path after said light passes through said deflecting means while forming a branched optical path before said light goes into said deflecting means, a signal corresponding to address data being inputted into said driving means;
   selecting whether to oscillate two light beams along a radius of a magneto-optical master disk by selecting said first and second optical paths while blocking said branched optical path, or to oscillate only one light beam along the radius of said magneto-optical master disk by selecting said second optical path and said branched optical path while blocking said first optical path; and forming a single tracking-use guiding groove by irradiating said two light beams on a photo-resist applied on a glass substrate in accordance with address data.

8. An apparatus of manufacturing a magneto-optical master disk comprising:

a light source emanating a light beam;

optical path splitting means for splitting a light path of said light beam in two to generate two light beams;

two deflecting means, respectively provided on said two optical paths, for deflecting each light beam;

two driving means for respectively driving said two deflecting means using signals corresponding to address data; and a switch for turning on/off input signals to said two driving means, respectively, wherein said two light beams oscillate along a radius of a magneto-optical master disk simultaneously when in-phase signals are respectively sent to said two driving means simultaneously by said switch, and one of said two light beams oscillates along the radius of said magneto-optical master disk when a signal is sent to only one of said two driving means by said switch.

9. The apparatus of claim 8, wherein said two deflecting means are placed in parallel with respect to a direction in which said two light beams are headed.

10. An apparatus of manufacturing a magneto-optical master disk comprising:

a light source for emanating a light beam;

first deflecting means for deflecting said light beam;

optical path splitting means for splitting an optical path of said light beam going out from said first deflecting means into two to generate two light beams;

second deflecting means provided on one of optical paths of said two light beams;

first and second driving means for respectively driving said first and second deflecting means using signals corresponding to address data; and switch for turning on/off input signals to said first and second driving means, respectively, wherein said two light beams oscillate along a radius of a magneto-optical master disk simultaneously when a signal is sent to said first driving means alone by said switch, and one of said two light beams oscillates along the radius of said magneto-optical master disk when a signal is sent to said second driving means alone by said switch.

11. The apparatus of claim 10, wherein said two light beams oscillate along the radius of said magneto-optical master disk simultaneously when a signal is sent to said first driving means alone, while one of said two light beams oscillates along the radius of said magneto-optical master disk when anti-phase signals are sent to said first and second driving means, respectively.

12. The apparatus of claim 10, wherein said first and second deflecting means are placed in series with respect to a direction in which said two light beams are headed.

13. An apparatus of manufacturing a magneto-optical master disk comprising:

a light source for emanating a light beam;

optical path splitting means for splitting an optical path of said light beam in two to generate two light beams;

first deflecting means provided on one of said two optical paths of said two light beams;

second deflecting means provided on an optical path made by synthesizing said two light beams;

first and second driving means for respectively driving said first and second deflecting means using signals corresponding to address data; and a switch for turning on/off input signals to said first and second driving means, respectively, wherein said two light beams oscillate along a radius of a magneto-optical master disk simultaneously when a signal is sent to said second driving means alone by said switch, and only one of said two light beams oscillates along the radius of said magneto-optical master disk when a signal is sent to said first driving means alone.

14. The apparatus of claim 13, wherein said two light beams oscillate along the radius of said magneto-optical master disk simultaneously when a signal is sent to said second driving means alone, and one of said two light beams oscillates along the radius of said magneto-optical master disk when anti-phase signals are sent to said first and second driving means, respectively.

15. The method of manufacturing a magneto-optical master disk of claim 4, wherein said two light beams are oscillated concurrently along a radius of said magneto-optical master disk by inputting a signal into said first driving means alone, and only one of said two light beams is oscillated along the radius of said magneto-optical master disk by inputting a said signal into said second driving means alone.

16. The method of manufacturing a magneto-optical master disk of claim 4, wherein said two light beams are oscillated concurrently along a radius of said magneto-optical master disk by inputting a first signal into said first driving means alone, and only one of said two light beams is oscillated along the radius of said magneto-optical master disk by inputting said first signal into said first driving means and by inputting a second signal into said second driving means, said first and second signals having anti-phases.

17. The method of manufacturing a magneto-optical master disk of claim 5, wherein said two light beams are oscillated concurrently along a radius of said magneto-optical master disk by inputting a signal into said second driving means alone, and only one of said two light beams is oscillated along the radius of said magneto-optical master disk by inputting said signal into said first driving means alone.

18. The method of manufacturing a magneto-optical master disk of claim 5, wherein said two light beams are oscillated concurrently along a radius of said magneto-optical master disk by inputting a first signal into said second driving means alone, and only one of said two light beams is oscillated along the radius of said magneto-optical master disk by inputting said first signal into said second driving means and by inputting a second signal into said first driving means, said first and second signals having anti-phases.

* * * * *